(12) United States Patent
Frederiksen et al.

(10) Patent No.: US 7,397,861 B2
(45) Date of Patent: Jul. 8, 2008

(54) MAPPING STRATEGY FOR OFDM-BASED SYSTEMS USING H-ARQ

(75) Inventors: Frank Frederiksen, Klarup (DK); Troels Kolding, Klarup (DK); Preben Mogensen, Gistrup (DK); Akhilesh Pokhariyal, Arhus C (DK)

(73) Assignee: Nokia Corpration, Espoo (FI)

( * ) Notice: Subject to any disclaimer, the term of this patent is extended or adjusted under 35 U.S.C. 154(b) by 613 days.

(21) Appl. No.: 11/034,452

(22) Filed: Jan. 11, 2005

(65) Prior Publication Data

US 2006/0104374 A1     May 18, 2006

Related U.S. Application Data

(60) Provisional application No. 60/628,828, filed on Nov. 16, 2004.

(51) Int. Cl.
*H04K 1/10* (2006.01)
(52) U.S. Cl. .................. 375/260; 375/259; 375/354
(58) Field of Classification Search ........... 375/259, 375/260, 295, 316, 354; 714/699, 712, 746, 714/747, 748, 750, 766; 455/403, 422.1, 455/39, 67.11, 68, 69, 73
See application file for complete search history.

(56) References Cited

U.S. PATENT DOCUMENTS 5,907,563 A * 5/1999 Takeuchi et al. ............ 714/751
6,738,370 B2   5/2004 Östman
6,779,146 B1 * 8/2004 Jones et al. .................. 714/748
2004/0199846 A1 * 10/2004 Matsumoto et al. ......... 714/748

OTHER PUBLICATIONS

Dobre, O.A., et al., "An adaptive data transmission scheme for OFDM systems". VTC 2002-Fall. 2002 IEEE 56th. Vehicular Technology Conference Proceedings. Vancouver, Canada, Sep. 24-28, 2002, IEEE Vehicular Technology Conference New York, NY: IEEE, US, vol. 1 of 4, Conf. 56, pp. 1398-1403, ISBN 0-7803-7467-3. See sections IID-III.

Liyu Cai, et al., "Improved HARQ scheme using channel quality feedback for OFDM systems". Vehicular Technology Conference, 2004. VTC 2004-Spring. 2004 IEEE 59th Milan, Italy May 17-19, 2004, Piscataway, NJ, USA, IEEE, US. May 17, 2004, pp. 1869-1872, ISBN 0-7803-8255-2. See section II.

* cited by examiner

*Primary Examiner*—Chieh M. Fan
*Assistant Examiner*—Jaison Joseph
(74) *Attorney, Agent, or Firm*—Ware, Fressola, Van Der Sluys & Adolphson LLP

(57) ABSTRACT

A wireless communication device, method and system adapted so that, in response to a repeat request indicating a communication signal (because of an error in transmission of the communication signal), the communication signal is wirelessly retransmitted using a remapping of bits into at least partially different frequencies in the retransmission compared to the original transmission.

14 Claims, 2 Drawing Sheets

MAPPING STRATEGY FOR OFDM-BASED SYSTEMS USING H-ARQ

CROSS REFERENCE To RELATED APPLICATION

Reference is made to and priority claimed from U.S. provisional application Ser. No. 60/628,828, filed Nov. 16, 2004, entitled MAPPING STRATEGY FOR OFDM-BASED SYSTEMS USING H-ARQ.

BACKGROUND OF THE INVENTION

1. Technical Field

The present invention pertains to the field of wireless communication. More particularly, the present invention pertains to wireless retransmission of data in response to an error in transmission.

2. Discussion of Related Art

For the evolution of 3G systems such as WCDMA, other access techniques such as OFDM have been considered besides WCDMA, especially for the downlink. Also, for future systems such as 3.9G and 4G, OFDM is a strong candidate for the access technique. OFDM uses subcarriers at different frequencies separated from adjacent frequencies so that each subcarrier is (at least approximately) orthogonal the other subcarriers. The information to be communicated, sometimes as packets (as opposed being communicated via a circuit switched network), is simultaneously conveyed by typically several of the subcarriers. In case of downlink, where the signal being transmitted includes packets for more than one user, the packet information for a first of the users is simultaneously conveyed by a first set (typically neighboring) of the subcarriers, and the packet information for a second of the users is simultaneously conveyed by a second set (typically neighboring) of the subcarriers, and so on. This approach relies on separation of the users in the frequency domain. Another way of separating the users could be in the time domain, such that different users have access to the frequency bands at different times.

In typical OFDM-based systems, the subcarriers are sometimes grouped into scheduling units, known as resource pools in 3GPP. The advantage of this approach—grouping subcarriers—is in connection with signalling complexity. A user needs to be told which resource pools to receive, and so having a large number of resource pools or scheduling units increases signalling complexity. Due to multipath propagation, the received signal power in each frequency band of an OFDM signal (i.e. the power for each subcarrier) often varies as a function of time (often as a result of the user moving during a communication session). Due to such power variations the corresponding channel quality of each subcarrier also varies. To combat the effects of multipath propagation, such a system will typically use forward error correction techniques. One of the most often-used techniques for forward error correction is turbo coding.

To be able to increase the spectral efficiency of such a system, the scheduling algorithms—used for scheduling when packets will be communicated—will typically use an aggressive approach where the packet error probability is relatively high (5-30%), and will rely on hybrid automatic repeat request (H-ARQ) to recover erroneously received packets.

One problem in using turbo coding is that for optimum decoding performance, all bits should be received with the same error probability. Having a high degree of variation in the error probabilities among the received bits causes packet error performance to degrade significantly. To randomize the occurrence of errors among the received bits, an interleaver is typically used (so that sequences of bits having higher error probability is largely avoided). If H-ARQ is used, the bits for retransmission will in some instances (depending on the retransmission strategy) be placed in the same positions in the bit stream (and thus the same position after the interleaving). This, in conjunction with scheduling based on segmentation into frequency sub-bands (bands of sub-carriers), can cause retransmitted data to have the same errors as in the original transmission.

What is needed is some way to avoid retransmitting data using OFDM so as to be likely to have the same errors as originally.

DISCLOSURE OF INVENTION

Accordingly, in a first aspect of the invention, a method is provided comprising: a step in which a transmitting device wirelessly receives a repeat request indicating a previous transmission of a communication signal representing a plurality of bits; and a step in which, in response to the repeat request, the transmitting device wirelessly retransmits the communication signal using a remapping of the bits of the communication signal into at least partially different frequencies in the retransmission compared to the previous transmission.

In accord with the first aspect of the invention, the transmitting device may keep track of which bits of the communication signal have been transmitted over which subcarriers, and may retransmit bits on a subcarrier only if the bits have not already been transmitted on the subcarrier.

Also in accord with the first aspect of the invention, for the previous transmission the transmitting device may divide the communication signal into blocks and then further divide each block into subblocks and convey each subblock using a corresponding set of subcarriers, and a subblock may be retransmitted only on an at least partly different set of subcarriers. Further, the transmitting device may transmit the subblocks of a block in an order having a predetermined correspondence to the number of times the block has been transmitted, whereby a receiving device receiving the subblocks and adapted to make the predetermined correspondence can reorder the subblocks so as to rebuild the block after determining the number of times the block has been transmitted or after being provided with the number of times the block has been transmitted via signaling by the transmitting device.

Also in accord with the first aspect of the invention, for the previous transmission, the device may divide the communication signal into blocks and may further divide each block into subblocks and convey each subblock using a corresponding set of subcarriers, and in the retransmission the order of transmission of the subblocks may be changed compared to the previous transmission and the set of subcarriers corresponding to each of the subblocks in the retransmission may be at least partly different compared to the set of frequencies for the subblocks used in the previous transmission.

In a second aspect of the invention, a computer program product is provided comprising a computer readable storage structure embodying computer program code thereon for execution by a computer processor, wherein said computer program code comprises instructions for performing a method according to the first aspect of the invention.

In a third aspect of the invention, a transmitter device is provided, comprising: means for wirelessly receiving a repeat request indicating a previous transmission of a communication signal; and means by which, in response to the repeat request, the device wirelessly retransmits the communication signal using a remapping of bits into at least partially different frequencies in the retransmission compared to the previous transmission.

In accord with the third aspect of the invention, the transmitter device may operate and so have means for operating according to the first aspect of the invention.

In a fourth aspect of the invention, a system is provided, comprising: a transmitter device according to the third aspect of the invention, for retransmitting the communication signal after performing the remapping; and a receiver device, responsive to the retransmitted communication signal, comprising means for decoding the retransmitted communication signal including performing processing of the retransmitted communication signal so as to undo the remapping.

In accord with the fourth aspect of the invention, the transmitter device may be capable of dividing the communication signal into blocks and further dividing each block into subblocks and transmitting the subblocks for a block in an order having a predetermined correspondence to the number of times the block has been transmitted, and the receiver device may be capable of making the predetermined correspondence so as to reorder the subblocks and so rebuild the block after determining the number of times the block has been transmitted or after being provided with the number of times the block has been transmitted via signaling by the transmitting device.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
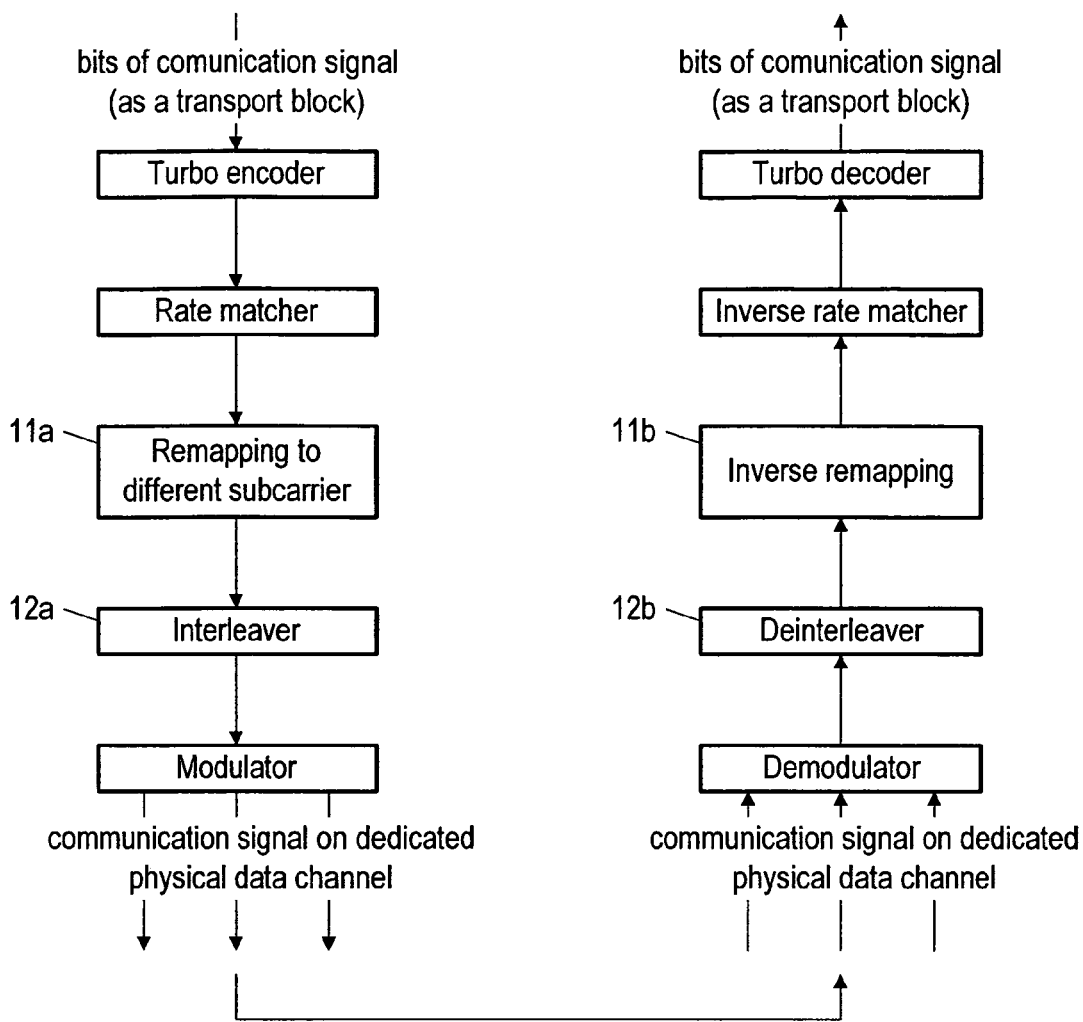
FIG. 1 is a block diagram/flow diagram of a coding and decoding chain according to the invention, showing the remapping to at least some different subcarriers of an OFDM signal in case of a retransmission.

According to the invention generally, for a wireless communication system using OFDM and typically H-ARQ (although other ways besides H-ARQ to cause a retransmission are also encompassed by the invention), when a communication device—here assumed to be the service access point (SAP)/Node B/base station of a radio access network (RAN) of the wireless communication system—retransmits data via OFDM to a mobile device, a remapping algorithm is used by the communication device to remap the bits to be transmitted into symbols used to modulate a carrier wave, with the remapping being done differently than the mapping in the previous transmission (the original transmission or the most recent subsequent retransmission if the data has already been retransmitted). The remapping algorithm is caused to execute after any interleaving of the bits corresponding to the data, and in some embodiments it provides a mapping depending on the (re-) transmission number for the H-ARQ. If interleaving is performed (as it usually is), the remapping algorithm can be integrated into a module including functionality for performing the interleaving, and can take into account the modulation scheme being used.

The rationale for the invention can be understood as follows. A typical implementation of H-ARQ according to the prior art performs a retransmission involving only the physical layer, meaning that the same data packet is transmitted again (perhaps using a slightly different method of coding, also known as using different redundancy versions). After the retransmission, the two (or more) parts of the received signals are combined, and another try for the decoding is attempted. However, in case of frequency selective fading, there are subcarriers that may experience poor propagation conditions again and again. Combining signals from such sub-carriers will in general not improve the quality of the received signal. Thus, according to the invention, remapping is performed in a way that ensures that bits used for a retransmission are not transmitted on the same sub-carriers as in the preceding transmission (or, ideally, any preceding transmission of the bits)

In one embodiment—called here a full remapping embodiment—a service access point (or other wireless communication device, e.g. a mobile device) according to the invention includes an algorithm that keeps track of which bits have been transmitted over which subcarriers, and when a re-transmission is requested (potentially over another set of carriers) by a mobile, retransmits bits on a subcarrier only if the bits have not already been transmitted on the subcarrier.

Such a principle could also be applied to blocks of encoded bits; in such an embodiment, a block of bits, maybe 20-500 bits, is retransmitted on a set of subcarriers only if the block of bits has not previously been transmitted on the same set of subcarriers. (Even if only one of the subcarriers in the candidate set is different than in the original set, the block of bits could be retransmitted using the candidate set of subcarriers.) In such an embodiment it would be advantageous (and even perhaps necessary) for there to be a signaling mechanism by which the service access point informs the mobile device which blocks are placed where in the full block sequence (requiring signaling bandwidth as well as complex signal processing at the service access point). (If the Node B positions the blocks 'at random' to avoid reusing the same carriers for a retransmission, the UE needs to know how to put the blocks together again, i.e. the sequence order should be signaled to the UE.)

In another embodiment—called here a reduced complexity remapping—the encoded and rate-matched block is divided into two or more sub-blocks—e.g. four sub-blocks 0, 1, 2, 3—and transmitted in the order given by the sequence, and so e.g. [0, 1, 2, 3] for a first transmission. If the mobile unit (or the service access point/Node B/base transceiver station) requests a retransmission, the service access point first cycles the blocks or otherwise reorders them and then retransmits them in the reordered sequence. For example, the first retransmission sequence could be: [2, 3, 0, 1]. For a second retransmission, the sequence could be: [1, 2, 3, 0]. For a third retransmission, the sequence could be: [3, 0, 1, 2]. In such an embodiment, transmission on the same subcarrier is still possible, but there is a quite low probability that this will happen. Furthermore, the mobile unit will know which retransmission number it is at, and should be able to do the reverse operation with no (or very little) signaling overhead. (In this scheme, the sequence ordering is a pre-defined function of the retransmission number, i.e. the mobile unit knows for example that at retransmission number '2' the sequence order [1, 2, 3, 0] is used, and the mobile unit can use this knowledge in the reordering. The only thing that needs to be signaled is the retransmission number, which could be either explicit (through signaling for each transmission) or implicit (by means of the Node B keeping track of the number of negative acknowledgements), and thereby keeping track of the retransmission number. The implicit method could however fail in case of the Node B misinterpreting ACK's and NACK's. Explicit signalling is therefore more robust, and would require 2-3 bits of signaling overhead.)

With the invention, of course, both the retransmitting wireless communication device and the wireless communication device requesting the retransmission are adapted according to the invention. Where the retransmitting wireless communication device is adapted to perform the remapping according to the invention, the wireless communication device requesting the retransmission is adapted to perform the inverse remapping.

Figure 2:
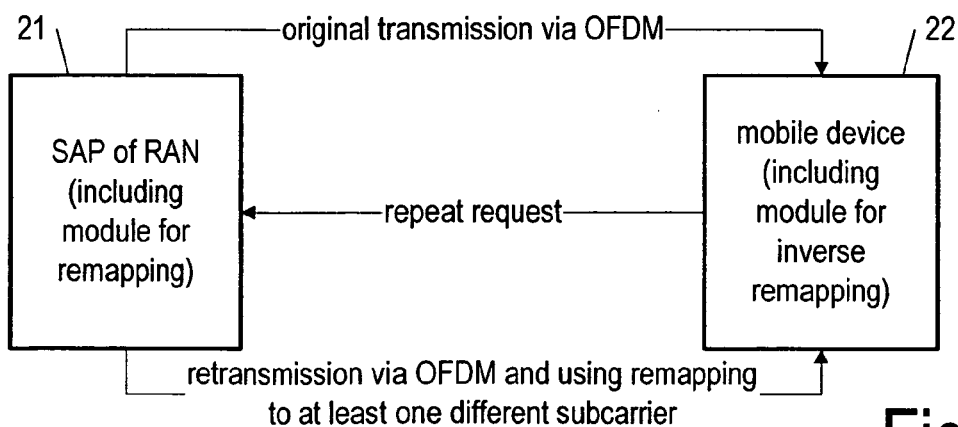
FIG. 2 is a block diagram/flow diagram showing two wireless communication devices according to the invention, and so including either a remapping component or an inverse remapping component as part of a coding or decoding chain of components as shown in FIG. 1.

Thus, and now referring now to FIGS. 1 and 2, when a mobile device 22 requests retransmission of a communication signal by a SAP 21 of a RAN, the SAP retransmits the communication signal using the coding chain (of components) indicated in FIG. 1—i.e. the components cooperating to provide the communication signal over the dedicated physical data channel. As shown, the coding chain includes a remapping component 11a performing remapping as explained above, and then an interleaver 12a, for taking in the bits to be transmitted and shuffling them in a predetermined manner. The coding chain also typically includes, before the remapping component, a turbo encoder encoding m input bits into n encoded bits, the ratio of m to n depending on the coding rate used by the turbo encoder, so that e.g. for an encoding rate of ½, each input bit is encoded into 2 output bits. Next, a rate matching block matches the number of bits to be transmitted to the physical channel capacity, by either puncturing some of the encoded bits (i.e. eliminating some of the redundant bits) or by repeating some of the encoded bits. Next, comes the remapping component and the interleaving block. Finally, a modulator, e.g. a QPSK/M-QAM modulator (i.e. a block performing quaternary phase shift keying or, alternatively, M-ary quadrature amplitude modulation) takes a group of bits and maps them into a modulation signal constellation. The process indicated in FIG. 1 is performed for each so-called dedicated physical data channel (DPDCH).

The decoding chain, also indicated in FIG. 1, shows a module 11b for performing the inverse of the remapping operation according to the invention, and is performed just after the deinterleaving operation (performed by a deinterleaving module 12b) required to undo the interleaving performed in the coding process.

Figure 3:
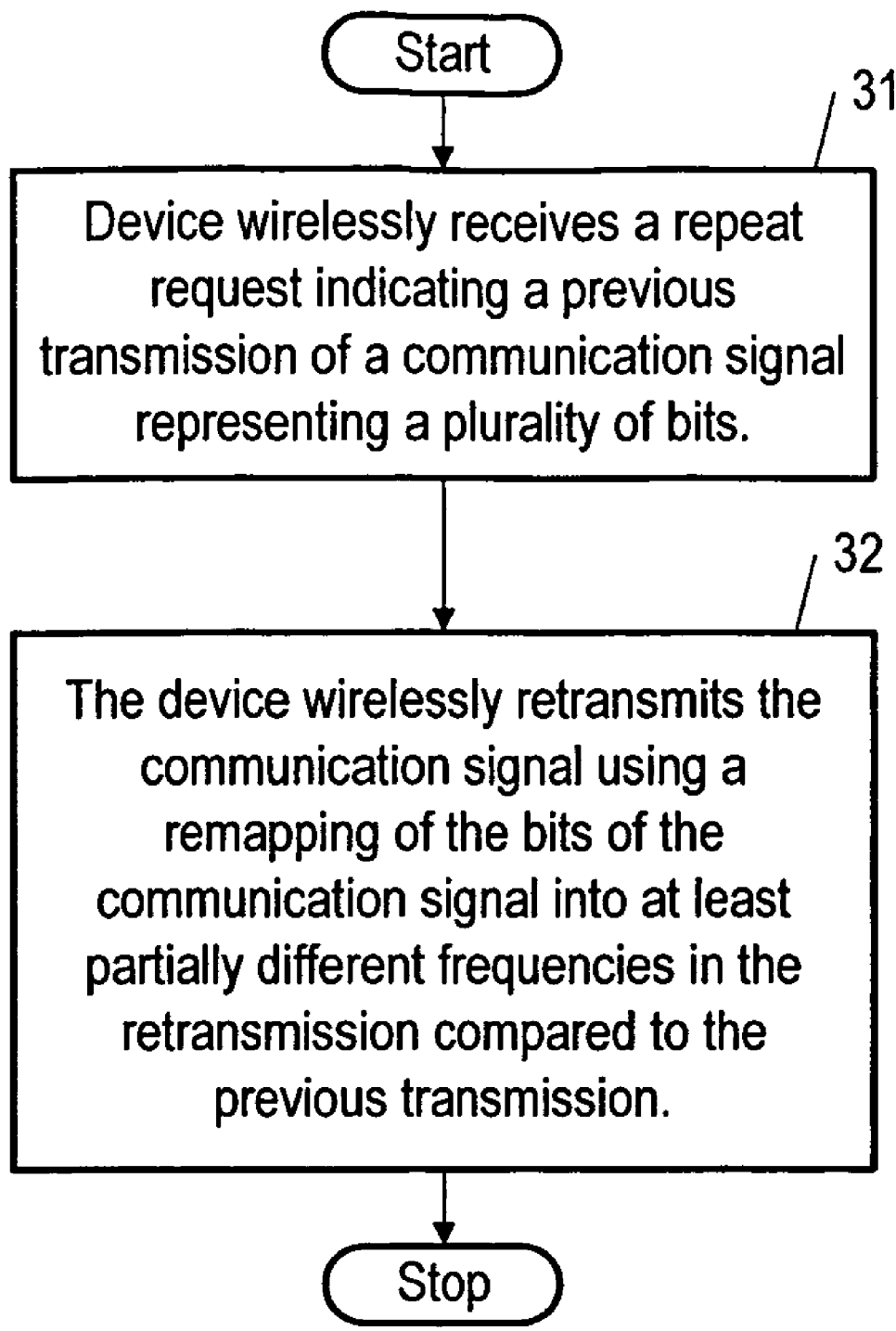
FIG. 3 is a flow chart of operation of a wireless communication device performing a retransmission according to the invention.

Referring now to FIG. 3, a method according to the invention includes a first step 31 in which a device—which could be either a SAP or a user equipment (UE)/mobile communication device—wirelessly receives a repeat request indicating a previous transmission of a communication signal representing a plurality of bits. In a next step 32, the device wirelessly retransmits the communication signal using a remapping of the bits of the communication signal into at least partially different frequencies in the retransmission compared to the previous transmission. The remapping could involve any of the block-related procedures—the full remapping or the reduced complexity remapping—described above. The remapping is performed after any interleaving of the bits to be retransmitted. (In a the typical implementation the data block is encoded, rate matched, and interleaved for each transmission and retransmission and the original data block is kept in the Node B buffer until an acknowledgement is received. However, instead of encoding, rate matching and interleaving for a retransmission, the once encoded, rate matched and interleaved data can instead be stored, but this would require more memory in the Node B.)

Note that the invention gains diversity by rearranging the bits before retransmission in such a way that the bits in the retransmission are sent using at least in part a different frequency. Further, instead of requiring changes to be made to the encoder/decoder so as to rearrange the bits and then reverse the process, the invention causes changes in the transmission of encoded data. (The 3GPP work is very much focused on reusability of blocks. Therefore it is desirable to have the turbo encoder working as a separate unit or block that can be used for any encoding. Any operations to the encoded bit stream should be handled by separate blocks.)

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
   receiving a repeat request indicating a previous transmission of a wireless communication signal conveying a block of a plurality of subblocks each conveying a plurality of bits, wherein each subblock is conveyed by a corresponding set of subcarriers of a carrier forming the communication signal; and
   retransmitting the wireless communication signal using a remapping of the bits into at least partially different frequencies in the retransmission compared to the previous transmission by retransmitting the subblocks in a different order, wherein the different order is based on a predetermined correspondence to the number of times the block has been transmitted.

2. A method as in claim 1, wherein in retransmitting the wireless communication signal the sub-locks are cyclically permuted.

3. A method as in claim 1, wherein in retransmitting the wireless communication signal the set of subcarriers corresponding to each of the subblocks in the retransmission is at least partly different compared to the set of subcarriers for the subblocks used in the previous transmission.

4. A computer program product comprising a computer readable storage structure embodying computer program code thereon for execution by a computer processor, wherein said computer program code comprises instructions for performing a method including the steps of claim 1.

5. An apparatus, comprising:
   means for receiving a repeat request indicating a previous transmission of a wireless communication signal conveying a block of a plurality of sub-blocks each conveying a plurality of bits, wherein each sub-block is conveyed by a corresponding set of subcarriers of a carrier forming the communication signal;
   means for retransmitting the wireless communication signal using a remapping of the bits into at least partially different frequencies in the retransmission compared to the previous transmission by remapping the subblocks in a different order compared to the previous transmission, wherein the different order is based on a predetermined correspondence to the number of times the block has been transmitted; and
   means for retransmitting the wireless communication signal.

6. An apparatus as in claim 5, wherein the means for retransmitting the wireless communication signal is configured to cyclically permute the subblocks.

7. An apparatus as in claim 5, wherein the means for wirelessly retransmitting the communication signal is configured so that the set of subcarriers corresponding to each of the subblocks in the retransmission is at least partly different compared to the set of subcarriers for the subblocks used in the previous transmission.

8. A system, comprising:
a transmitter device including an apparatus as in claim 5; and
a receiver device, responsive to the retransmitted communication signal, comprising means for decoding the retransmitted communication signal including performing processing of the retransmitted communication signal so as to undo the remapping of the subblocks in a different order compared to the previous transmission.

9. A system as in claim 8, wherein the transmitter device is capable of dividing the communication signal into blocks and further dividing each block into subblocks and transmitting the subblocks for a block in an order having a predetermined correspondence to the number of times the block has been transmitted, and the receiver device is capable of making the predetermined correspondence so as to reorder the subblocks and so rebuild the block after determining the number of times the block has been transmitted or after being provided with the number of times the block has been transmitted via signaling by the transmitter device.

10. An apparatus, comprising: a remapping module, for receiving a repeat request indicating a previous transmission of a wireless communication signal conveying a block of a plurality of subblocks each conveying a plurality of bits, wherein each subblock is conveyed by a corresponding set of subcarriers of a carrier forming the communication signal, and for retransmitting the wireless communication signal using a remapping of the bits into at least partially different frequencies in the retransmission compared to the previous transmission by providing the subblocks for a retransmission in a different order compared to the previous transmission, based on a predetermined correspondence to the number of times the block has been transmitted.

11. An apparatus as in claim 10, wherein the remapping module is configured to cyclically permute the sub-blocks.

12. An apparatus as in claim 10, wherein the remapping module is configured so that the set of subcarriers corresponding to each of the subblocks in the retransmission is at least partly different compared to the set of subcarriers for the subblocks used in the previous transmission.

13. A wireless communication terminal, comprising:
a transmitter, for receiving a repeat request indicating a previous transmission by the wireless communication terminal of a wireless communication signal conveying a block of a plurality of sub-locks each conveying a plurality of bits, wherein each subblock is conveyed by a corresponding set of subcarriers of a carrier forming the communication signal, for retransmitting the wireless communication signal using a remapping of the bits into at least partially different frequencies in the retransmission compared to the previous transmission by providing the subblocks for retransmission in a different order based on a predetermined correspondence to the number of times the block has been transmitted by the wireless communication terminal; and
a receiver, responsive to a retransmitted communication signal providing subblocks of a block in a different order compared to a previous transmission by a sending wireless communication terminal, based on a predetermined correspondence to the number of times the block has been transmitted by the sending wireless communication terminal, configured to decode the retransmitted communication signal including performing processing of the retransmitted communication signal.

14. A system, comprising a plurality of wireless communication terminals as in claim 13, wherein at least one of the wireless communication terminals is an element of a radio access network.

* * * * *

UNITED STATES PATENT AND TRADEMARK OFFICE
CERTIFICATE OF CORRECTION

PATENT NO. : 7,397,861 B2 Page 1 of 1
APPLICATION NO. : 11/034452
DATED : July 8, 2008
INVENTOR(S) : Frederiksen et al.

It is certified that error appears in the above-identified patent and that said Letters Patent is hereby corrected as shown below:

In column 6, line 38, claim 2, line 2, "sub-locks" should be --sub-blocks--.

In column 8, line 15, claim 13, line 5, "sub-locks" should be --sub-blocks--.

Signed and Sealed this

Twenty-third Day of September, 2008

JON W. DUDAS
*Director of the United States Patent and Trademark Office*